United States Patent
Azuma et al.

(10) Patent No.: US 11,842,160 B2
(45) Date of Patent: Dec. 12, 2023

(54) KEYWORD EXTRACTION WITH FREQUENCY—INVERSE DOCUMENT FREQUENCY METHOD FOR WORD EMBEDDING

(71) Applicant: International Business Machines Corporation, Armonk, NY (US)

(72) Inventors: Yukihiro Azuma, Yokohama (JP); Kazuhito Oguma, Funabashi (JP)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 17/305,750

(22) Filed: Jul. 14, 2021

(65) Prior Publication Data
US 2023/0034153 A1   Feb. 2, 2023

(51) Int. Cl.
*G06F 40/30* (2020.01)
*G06F 16/33* (2019.01)
(Continued)

(52) U.S. Cl.
CPC .......... *G06F 40/30* (2020.01); *G06F 16/3334* (2019.01); *G06F 18/214* (2023.01); *G06F 18/2321* (2023.01); *G06F 40/268* (2020.01)

(58) Field of Classification Search
CPC ............... G06F 16/3334; G06F 18/214; G06F 18/2321; G06F 40/268; G06F 40/30
See application file for complete search history.

(56) References Cited

U.S. PATENT DOCUMENTS

2014/0149412 A1* 5/2014 Nakamura ............ G06F 16/355
707/737
2017/0277672 A1* 9/2017 Cho ...................... G06F 40/279
(Continued)

FOREIGN PATENT DOCUMENTS

CN         108170666 A     6/2018
CN         111401056 A     7/2020
(Continued)

OTHER PUBLICATIONS

Z. Zhu, J. Liang, D. Li, H. Yu and G. Liu, "Hot Topic Detection Based on a Refined TF-IDF Algorithm,", 2019, in IEEE Access, vol. 7, pp. 26996-27007, doi: 10.1109/ACCESS.2019.2893980 (Year: 2019).*

(Continued)

*Primary Examiner* — Eric Yen
(74) *Attorney, Agent, or Firm* — Edward P. Li

(57) ABSTRACT

A computer-implemented method, a computer program product, and a computer system for keyword extraction. A computer vectorizes word sets by splitting text in a corpus. The computer trains a Gaussian mixture distribution model for the word sets and obtains an inverse document frequency (IDF) value of a word set from the learned Gaussian mixture distribution model. The computer trains a Gaussian mixture distribution model for a cluster and obtains a term frequency (TF) value of the word set in the cluster from the learned Gaussian mixture distribution model. The computer calculates a term frequency-inverse document frequency (TF-IDF) value of the word set in the cluster, based on the TF value and the IDF value. The computer calculates TF-IDF values of the word sets in clusters and rearranges the word sets in a descending order of the TF-IDF values to obtain extracted keywords.

20 Claims, 5 Drawing Sheets

(51) Int. Cl.
*G06F 40/268* (2020.01)
*G06F 18/214* (2023.01)
*G06F 18/2321* (2023.01)

(56) References Cited

U.S. PATENT DOCUMENTS

| | | | |
|---|---|---|---|
| 2019/0266182 A1* | 8/2019 | Yoshikawa | G06F 40/289 |
| 2020/0226154 A1 | 7/2020 | Muffat | |
| 2021/0104322 A1* | 4/2021 | Narayan | G06N 3/045 |
| 2021/0149994 A1* | 5/2021 | Kim | G06N 3/042 |
| 2022/0114340 A1* | 4/2022 | Graeser | G06N 3/045 |
| 2022/0138421 A1* | 5/2022 | Iwasaki | G06F 40/279 |
| | | | 715/256 |

FOREIGN PATENT DOCUMENTS

| | | | | |
|---|---|---|---|---|
| WO | WO-2019013376 A1 * | 1/2019 | | G06F 16/31 |
| WO | 2019103224 A1 | 5/2019 | | |

OTHER PUBLICATIONS

L. Yao, Z. Pengzhou and Z. Chi, "Research on News Keyword Extraction Technology Based on TF-IDF and TextRank,", 2019, 2019 IEEE/ACIS 18th International Conference on Computer and Information Science (ICIS), Beijing, China, pp. 452-455, doi: 10.1109/ICIS46139.2019.8940293 (Year: 2019).*

"Snow T15: Japanese Simplified Corpus with Core Vocabulary", The 11th International Conference on Language Resources and Evaluation (LREC 2018), English translation, 5 pages, <http://www.jnlp.org/SNOW/T15>.

"Universal-Sentence-Encoder-Multilingual", TensorFlow Hub, Updated: May 11, 2021, 6 pages, <https://tfhub.dev/google/universal-sentence-encoder-multilingual/3>.

Mell, et al., "The NIST Definition of Cloud Computing", National Institute of Standards and Technology, Special Publication 800-145, Sep. 2011, 7 pages.

* cited by examiner

US 11,842,160 B2

KEYWORD EXTRACTION WITH FREQUENCY—INVERSE DOCUMENT FREQUENCY METHOD FOR WORD EMBEDDING

BACKGROUND

The present invention relates generally to natural language processing, and more particularly to keyword extraction with an advanced term frequency-inverse document frequency (TF-IDF) method for word embedding.

With increasing amount of information, text summarization is one of important tasks in natural language processing. There are some types of the text summarization, such as generation of summary text, removal of unnecessary words, and keyword extraction.

A typical method of keyword extraction is a TF-IDF method based on the number of times of occurrence of a word in text. The TF-IDF method is often carried out with Bag of Words that is conventional text representation. However, Bag of Words cannot use meaning of words and is difficult to apply to, for example, customer service in which different persons use different wordings. This problem can be addressed by vectorization using distributed representation such as Bidirectional Encoder Representations from Transformers (BERT) that has been rapidly developing in recent years.

There are some methods using distributed representation, such as a semantic representation network and visualization of annotation in text. These methods are effective for single text, but are not suitable for selecting representative words from text classified into clusters.

SUMMARY

In one aspect, a computer-implemented method for keyword extraction is provided. The computer-implemented method includes vectorizing word sets, where the word sets are formed by splitting text in a corpus. The computer-implemented method further includes training a Gaussian mixture distribution model for the word sets, by using all vectorized word sets as training data. The computer-implemented method further includes obtaining an inverse document frequency (IDF) value of a word set, from a learned Gaussian mixture distribution model for the word sets. The computer-implemented method further includes training a Gaussian mixture distribution model for a cluster, by using vectorized word sets in the cluster as training data. The computer-implemented method further includes obtaining a term frequency (TF) value of the word set in the cluster, from a learned Gaussian mixture distribution model for the cluster. The computer-implemented method further includes calculating a term frequency-inverse document frequency (TF-IDF) value of the word set in the cluster, based on the TF value and the IDF value. The computer-implemented method further includes calculating TF-IDF values of the word sets in clusters. The computer-implemented method further includes obtaining extracted keywords, by rearranging the word sets in a descending order of the TF-IDF values.

In another aspect, a computer program product for keyword extraction is provided. The computer program product comprises a computer readable storage medium having program instructions embodied therewith, and the program instructions are executable by one or more processors. The program instructions are executable to: vectorize word sets, where the word sets are formed by splitting text in a corpus; train a Gaussian mixture distribution model for the word sets, by using all vectorized word sets as training data; obtain an inverse document frequency (IDF) value of a word set, from a learned Gaussian mixture distribution model for the word sets; train a Gaussian mixture distribution model for a cluster, by using vectorized word sets in the cluster as training data; obtain a term frequency (TF) value of the word set in the cluster, from a learned Gaussian mixture distribution model for the cluster; calculate a term frequency-inverse document frequency (TF-IDF) value of the word set in the cluster, based on the TF value and the IDF value; calculate TF-IDF values of the word sets in clusters; and obtain extracted keywords, by rearranging the word sets in a descending order of the TF-IDF values.

In yet another aspect, a computer system for keyword extraction is provided. The computer system comprises one or more processors, one or more computer readable tangible storage devices, and program instructions stored on at least one of the one or more computer readable tangible storage devices for execution by at least one of the one or more processors. The program instructions are executable to vectorize word sets, wherein the word sets are formed by splitting text in a corpus. The program instructions are further executable to train a Gaussian mixture distribution model for the word sets, by using all vectorized word sets as training data. The program instructions are further executable to obtain an inverse document frequency (IDF) value of a word set, from a learned Gaussian mixture distribution model for the word sets. The program instructions are further executable to train a Gaussian mixture distribution model for a cluster, by using vectorized word sets in the cluster as training data. The program instructions are further executable to obtain a term frequency (TF) value of the word set in the cluster, from a learned Gaussian mixture distribution model for the cluster. The program instructions are further executable to calculate a term frequency-inverse document frequency (TF-IDF) value of the word set in the cluster, based on the TF value and the IDF value. The program instructions are further executable to calculate TF-IDF values of the word sets in clusters. The program instructions are further executable to obtain extracted keywords, by rearranging the word sets in a descending order of the TF-IDF values.

DETAILED DESCRIPTION

Embodiments of the present invention propose a method of extending the term frequency-inverse document frequency (TF-IDF) method to distributed representation for extracting representative words. The present invention is about keyword extraction used for grasping the attributes of text. More particularly, embodiments of the present invention is intended to improve accuracy of representative word extraction used for visualizing results of clustering.

The TF-IDF method is expressed by the following expressions:

$$tfidf_{i,j} = tf_{i,j} \cdot idf_i$$

$$tf_{i,j} = \frac{n_{i,j}}{\sum_k n_{k,j}}$$

$$idf_i = \log \frac{|D|}{|d: d \ni t_i|}$$

where $tf_{i,j}$ is the frequency of occurrence of word $t_i$ in document $d_j$, $idf_i$ is inverse document frequency of word $t_i$, $n_{i,j}$ is the number of times of occurrence of word $t_i$ in document $d_j$, $\sum_k n_{k,j}$ is the total number of times of occurrence of all words in document $d_j$, $|D|$ is the total number of documents, and $|d: d \ni t_i|$ is the number of documents including word $t_i$. The TF-IDF method represents a product of term frequency in a cluster and inverse document frequency outside the cluster.

In Bag-of-words, which is often used in the TF-IDF method, each word is discretely represented. However, in distributed representation, each word is represented in a vector format. Therefore, the position a word takes in a vector space is determined by the meaning of the word, and the distance between words (distance between vectors) can be seen as the similarity of words. Based on these characteristics, when a word is featured by a distributed expression, it can be assumed that, in a vector space to which the distributed representation belongs, a position in the vector space represents meaning of natural language. Based on the above assumption, occurrence of a word in a cluster should have an influence on occurrence rates of the word and also surrounding words (having similar meaning).

Considering that the occurrence rates of words follow a normal distribution when the amount of original text is large enough, a distribution of words in the cluster can be represented by a Gaussian mixture distribution. The Gaussian mixture distribution can be considered as probability density distribution of words in a semantic space. Thus, the Gaussian mixture distribution can be treated as the frequency of occurrence of words in the cluster, and the Gaussian mixture distribution can be used to calculate the frequency of occurrence of words in the cluster and the inverse document frequency outside the cluster in the TF-IDF method.

Figure 1:
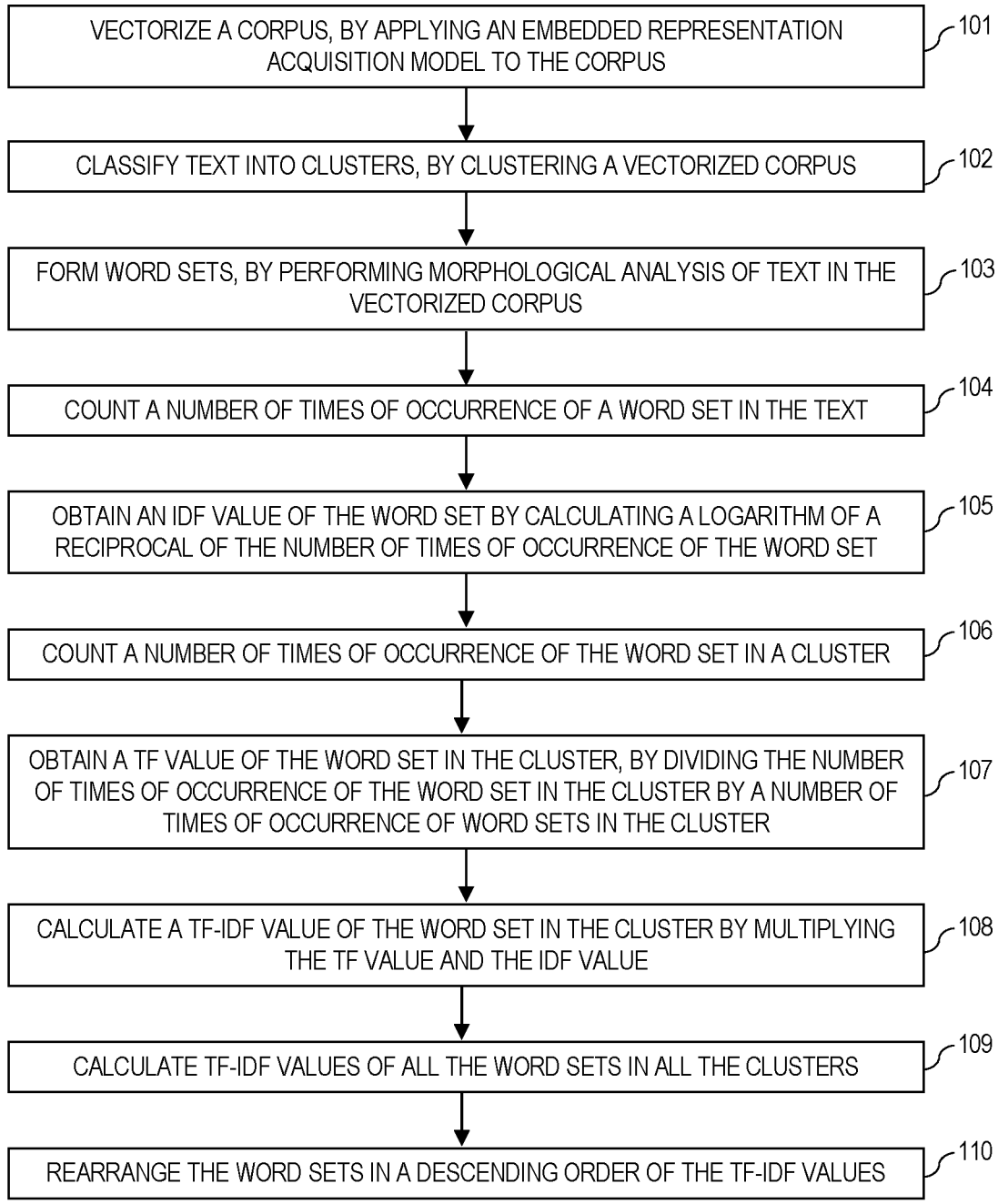
FIG. 1 is a flowchart showing operational steps of keyword extraction with a conventional term frequency-inverse document frequency (TF-IDF) method.

FIG. 1 is a flowchart showing operational steps of keyword extraction with a conventional TF-IDF method. The operational steps of the conventional TF-IDF method is implemented by one or more computing devices or servers. At step 101, a computing device or server vectorizes a corpus, by applying an embedded representation acquisition model to the corpus. At step 102, the computing device or server classifies text into clusters, by clustering a vectorized corpus obtained at step 101. At step 103, the computing device or server forms word sets, by performing morphological analysis of text in the corpus. At step 104, the computing device or server counts a number of times of occurrence of a word set in the text. At step 105, the computing device or server obtains an inverse document frequency (IDF) value of the word set by calculating a logarithm of a reciprocal of the number of times of occurrence of the word set. At step 106, the computing device or server counts a number of times of occurrence of the word set in a cluster. At step 107, the computing device or server obtains a term frequency (TF) value of the word set in the cluster, by dividing the number of times of occurrence of the word set in the cluster by a number of times of occurrence of word sets in the cluster. At step 108, the computing device or server calculates a term frequency-inverse document frequency (TF-IDF) value of the word set in the cluster by multiplying the TF value and the IDF value. At step 109, the computing device or server calculates TF-IDF values of all the word sets in all the clusters. To calculate the TF-IDF values of all the word sets for all the cluster, the computing device or server iterates steps 104-108. At step 110, the computing device or server rearranges the word sets in a descending order of the TF-IDF values. The computing device or server selects top word sets as representative words (or key words) for the text.

Figure 2:
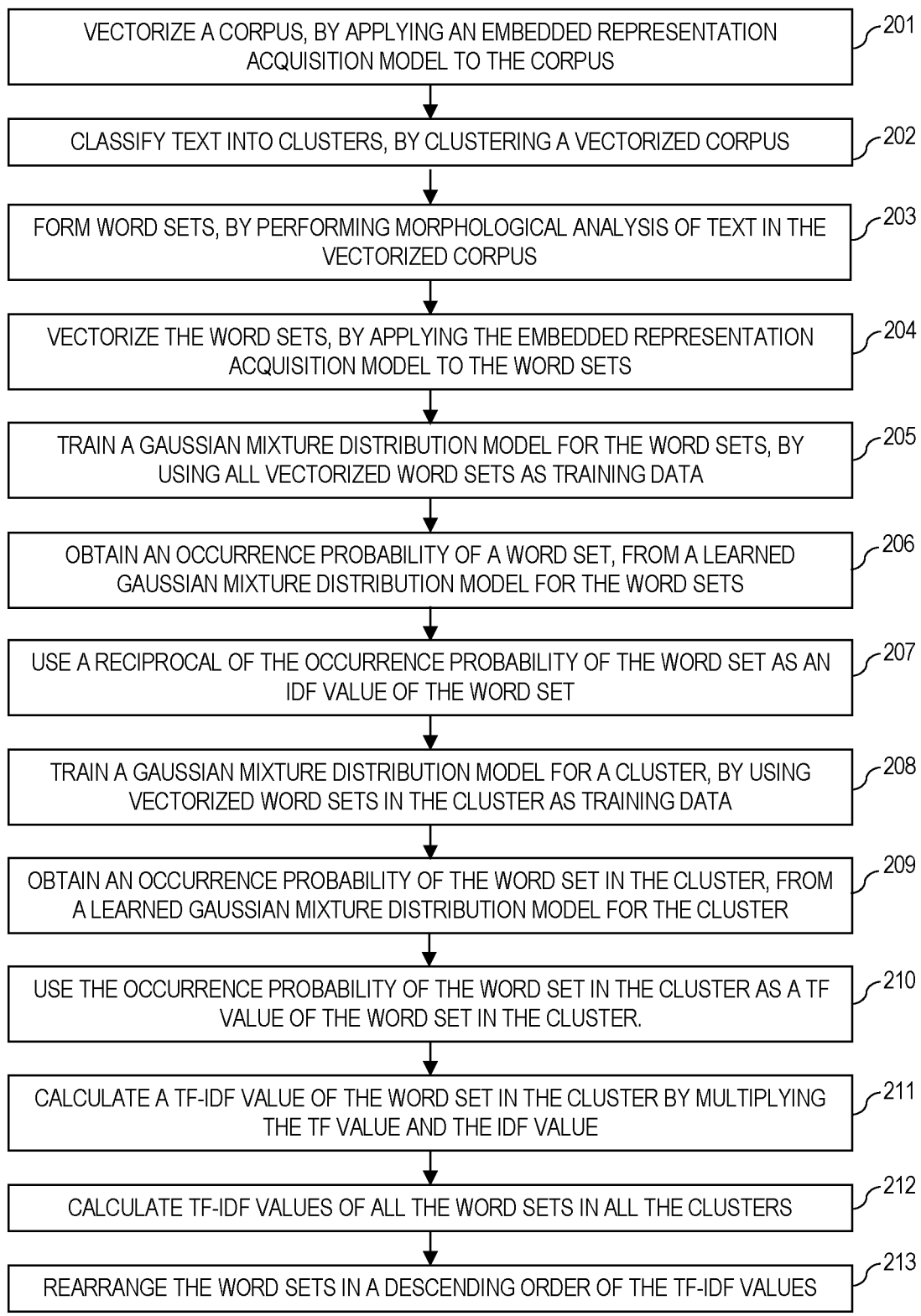
FIG. 2 is a flowchart showing operational steps of keyword extraction with an advanced term frequency-inverse document frequency (TF-IDF) method for word embedding, in accordance with one embodiment of the present invention.

FIG. 2 is a flowchart showing operational steps of keyword extraction with an advanced TF-IDF method for word embedding, in accordance with one embodiment of the present invention. The operational steps of the advanced TF-IDF method in the present invention is implemented by one or more computing devices or servers. A computing device or server is described in more detail in later paragraphs with reference to FIG. 3. In some embodiments, the operational steps may be implemented in a cloud computing environment. The cloud computing environment is described in later paragraphs with reference to FIG. 4 and FIG. 5.

At step 201, a computing device or server vectorizes a corpus, by applying an embedded representation acquisition model to the corpus. At step 202, the computing device or server classifies text into clusters, by clustering a vectorized corpus obtained at step 101. For example, the computing device or server may apply hierarchical clustering or k-means clustering to the vectorized corpus. At step 203, the computing device or server forms word sets, by performing morphological analysis of text in the corpus. For example, the computing device or server may split the text into a 2-gram and adverbial phrases or n-grams and period separators. Steps 201-203 of the advanced TF-IDF method in the present invention are the same as steps 101-103 of the conventional TF-IDF method.

At step 204, the computing device or server vectorizes the word sets, by applying the embedded representation acquisition model to the word sets. At this step, the word sets formed at step 203 are vectorized. Each word set is represented in a vector format. A position of a word set in a vector space is determined by the meaning of the word set, and the distance between words sets can be seen as the similarity of words.

At step 205, the computing device or server trains a Gaussian mixture distribution model for the word sets, by using all vectorized word sets as training data. When the number of the all vectorized word sets is large enough, the occurrence rates of the all vectorized words follow a normal distribution, and a probability density distribution in a semantic space of the all vectorized word sets can be represented by the Gaussian mixture distribution model.

An occurrence probability of any word set can be calculated from the Gaussian mixture distribution model trained by the all vectorized word sets. Thus, at step 206, the computing device or server obtains an occurrence probability of a word set, from a learned Gaussian mixture distribution model for the word sets. Then, at step 207, the computing device or server uses a reciprocal of the occurrence probability of the word set as an inverse document frequency (IDF) value of the word set.

At step 208, the computing device or server trains a Gaussian mixture distribution model for a cluster, by using vectorized word sets in the cluster as training data. When the number of the vectorized word sets in the cluster is large enough, the occurrence rates of the vectorized word sets in the cluster follow a normal distribution, and a probability density distribution in a semantic space of vectorized word sets in the cluster can be represented by the Gaussian mixture distribution model which is trained by the vectorized word sets in the cluster.

An occurrence probability of any word set in any cluster can be calculated from the Gaussian mixture distribution model trained by the vectorized word sets in that cluster. At step 209, the computing device or server obtains an occurrence probability of the word set in the cluster, from a learned Gaussian mixture distribution model for the cluster. At step 210, the computing device or server uses the occurrence probability of the word set in the cluster as a term frequency (TF) value of the word set in the cluster.

At step 211, the computing device or server calculates a term frequency-inverse document frequency (TF-IDF) value of the word set in the cluster by multiplying the TF value (obtained at step 210) and the IDF value (obtained at step 207). The TF-IDF value is a product of the TF value and the IDF value. Thus, once the IDF value is obtained by using the learned Gaussian mixture distribution model for all the word sets and the TF value is obtained by using the learned Gaussian mixture distribution model for the cluster, the TF-IDF value of the word set in the cluster can be obtained by finding the product of the TF value and the IDF value.

Through steps 205-211, the TF-IDF value for a respective one of the word sets in a respective one of the clusters is calculated. At step 212, the computing device or server calculates TF-IDF values of all the word sets in all the clusters. To calculate the TF-IDF values of all the word sets in all the cluster, the computing device or server iterates steps 205-211.

At step 213, the computing device or server rearranges the word sets in a descending order of the TF-IDF values. After obtaining the TF-IDF values of all the word sets in all the clusters, the computing device or server ranks the word sets and finds top word sets as representative words (or key words) for the text. Through the advanced TF-IDF method disclosed in the present invention, the representative words (or key words) are extracted from the text.

The proposed method in the present invention and the conventional method were evaluated. A dataset of Japanese Simplified Corpus with Core Vocabulary was used. The Universal Sentence Encoder was used as the embedded representation acquisition model. Principal component analysis (PCA) was used a dimension reduction tool and the number of the dimensions is 8. Hierarchical clustering was applied. Unweighted pair group method with arithmetic mean (UPGMA) was used for calculating distance between clusters. The distance metric was Euclidean distance. The number of split clusters was 128.

Each of Tables 1.1, 2.1, 3.1, and 4.1 presents examples of text: 10 random sentences extracted form hundreds sentences in a cluster. Tables 1.2, 2.2, 3.2, and 4.2 present comparison between the conventional method and the proposed method; these tables show top 7 word sets as representative words extracted from text presented in Tables 1.1, 2.1, 3.1, and 4.1, respectively.

TABLE 1.1

Text: 10 random examples from total 165 sentences in a cluster

I want to go abroad next year.
Many young people go abroad during summer vacation.
Have you ever been to Hawaii?
She's every bit an English lady.
He is an American.
My brother has been living in London for many years.
She came all the way from New York to see me.
He is either in London or in Paris.
Mother allowed me to go abroad.
I will have been to New York twice this time.

TABLE 1.2

Representative words: Top 7 word sets

| | Conventional Method | Proposed Method |
|---|---|---|
| 1 | Have been to | He . . . at that time |
| 2 | Will you go | That person |
| 3 | Went to | To New York twice |
| 4 | To New York twice | In London |
| 5 | Have seen | Abroad someday |
| 6 | Two years ago | To America someday |
| 7 | Leave | Abroad next year |

TABLE 2.1

Text: 10 random examples from total 204 sentences in a cluster

There is plenty of food.
Bring in lunch for the children
I usually have breakfast at seven.
You should eat something for breakfast before you go.
You shouldn't be so picky about food.
The more popcorn you eat, the more you want.
Will you read this cookbook?
Breakfast will not be served after ten o'clock.
After two days, our food gave out.
I don't feel like eating at all.

TABLE 2.2

Representative words: Top 7 word sets

| | Conventional Method | Proposed Method |
|---|---|---|
| 1 | Take | Cook |
| 2 | Do you have | You can |
| 3 | Do you like | Dinner today |
| 4 | Often go fishing | This steak |
| 5 | Souvenir | Dinner this evening |
| 6 | Something to eat | Dinner will . . . soon |
| 7 | Eat . . . raw | Those apples |

TABLE 3.1

Text: 10 random examples from total 419 sentences in a cluster

I feel good this morning
I feel much worse today than yesterday
I am going to take two days off next week
You didn't sleep well last night did you
I feel like a rest
I'm getting sick of the ride
I was very tired, so I went to bed early
Will it be fine tomorrow
I'll be back within two hours
I felt a bit tired from swimming from swimming all morning

TABLE 3.2

Representative words: Top 7 word sets

| | Conventional Method | Proposed Method |
|---|---|---|
| 1 | I'll be | am very tired |
| 2 | I feel | been very fine |
| 3 | at seven | been very |
| 4 | to bed | as five |
| 5 | tomorrow morning | I am very tired |
| 6 | at six | very tired, I fell |
| 7 | he was busy | very tired but I |

TABLE 4.1

Text: 10 random examples from total 282 sentences in a cluster

It was a very cold winter
The school was closed due to the snow
Hurry up, or it will start raining
It is nice and warm today
It may rain tomorrow
It was a very cold winter
The school was closed due to the snow
Hurry up, or it will start raining
It is nice and warm today
It may rain tomorrow

TABLE 4.2

Representative words: Top 7 word sets

| | Conventional Method | Proposed Method |
|---|---|---|
| 1 | the snow | it was |
| 2 | the rain | the rain |
| 3 | the weather | the weather |
| 4 | a cold | the snow |
| 5 | to rain | today it's pretty hot |
| 6 | the wind | pretty warm today |
| 7 | It may | Lovely day it |

Figure 3:
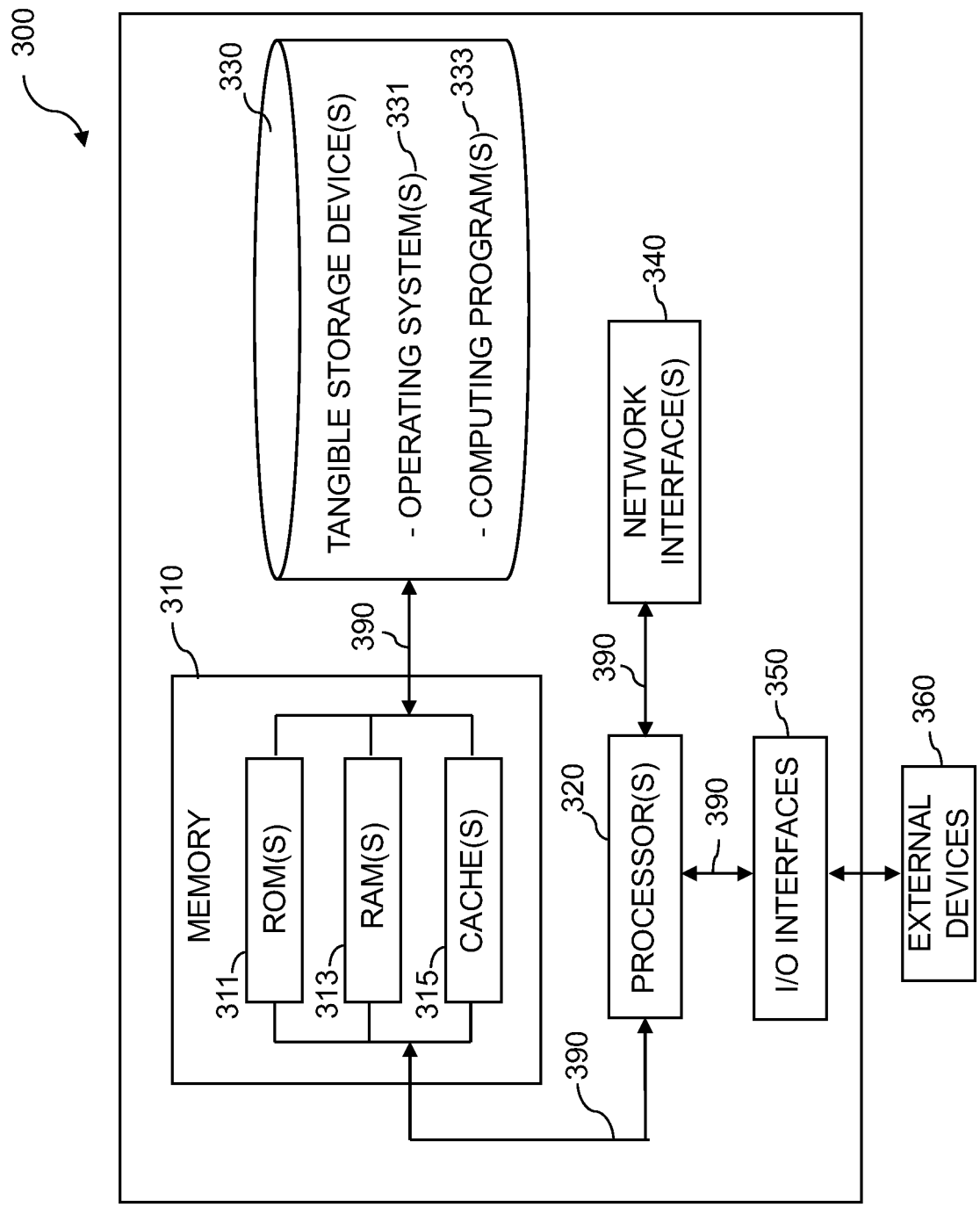
FIG. 3 is a diagram illustrating components of a computing device, in accordance with one embodiment of the present invention.

FIG. 3 is a diagram illustrating components of computing device or server 300, in accordance with one embodiment of the present invention. It should be appreciated that FIG. 3 provides only an illustration of one implementation and does not imply any limitations with regard to the environment in which different embodiments may be implemented.

Referring to FIG. 3, computing device or server 300 includes processor(s) 320, memory 310, and tangible storage device(s) 330. In FIG. 3, communications among the above-mentioned components of computing device or server 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330.

Computing device or server 300 further includes I/O interface(s) 350. I/O interface(s) 350 allows for input and output of data with external device(s) 360 that may be connected to computing device or server 300. Computing device or server 300 further includes network interface(s) 340 for communications between computing device or server 300 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
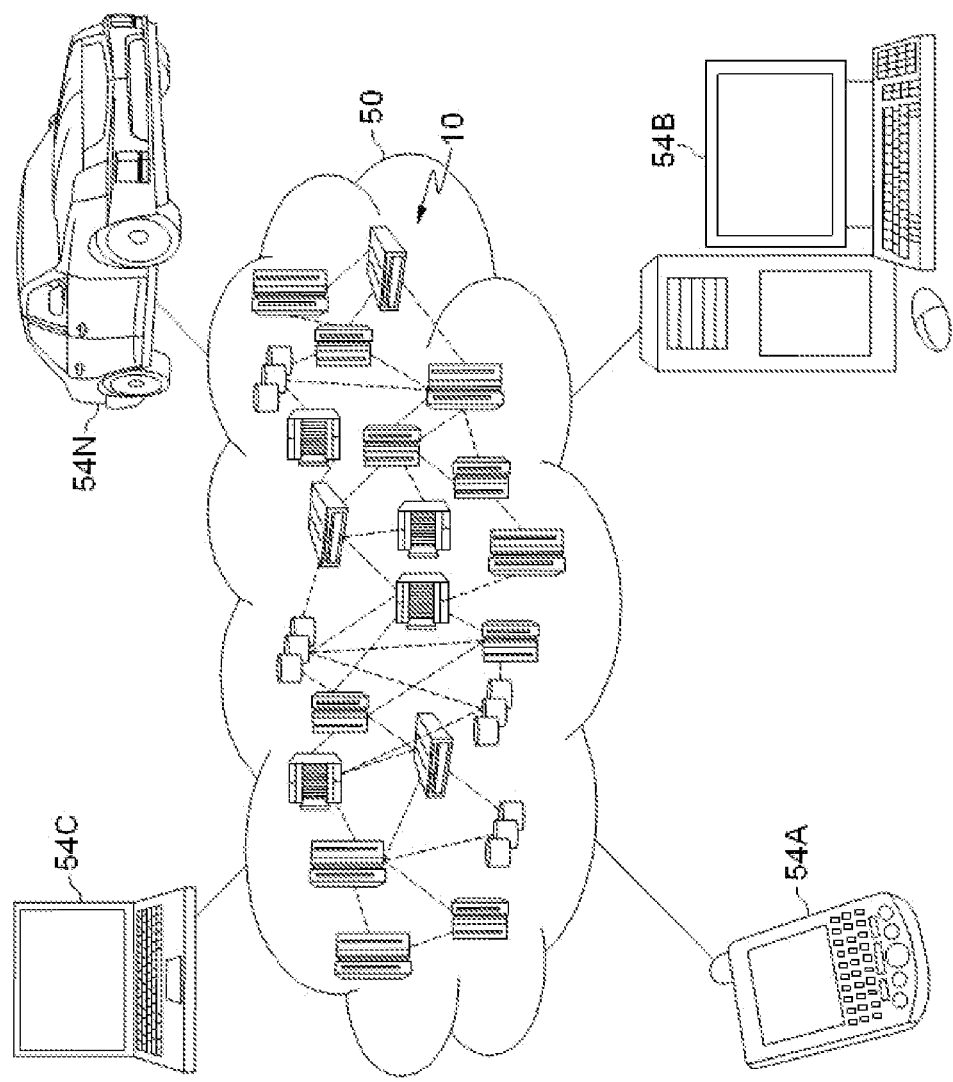
FIG. 4 depicts a cloud computing environment, in accordance with one embodiment of the present invention.

Referring now to FIG. 4, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 5:
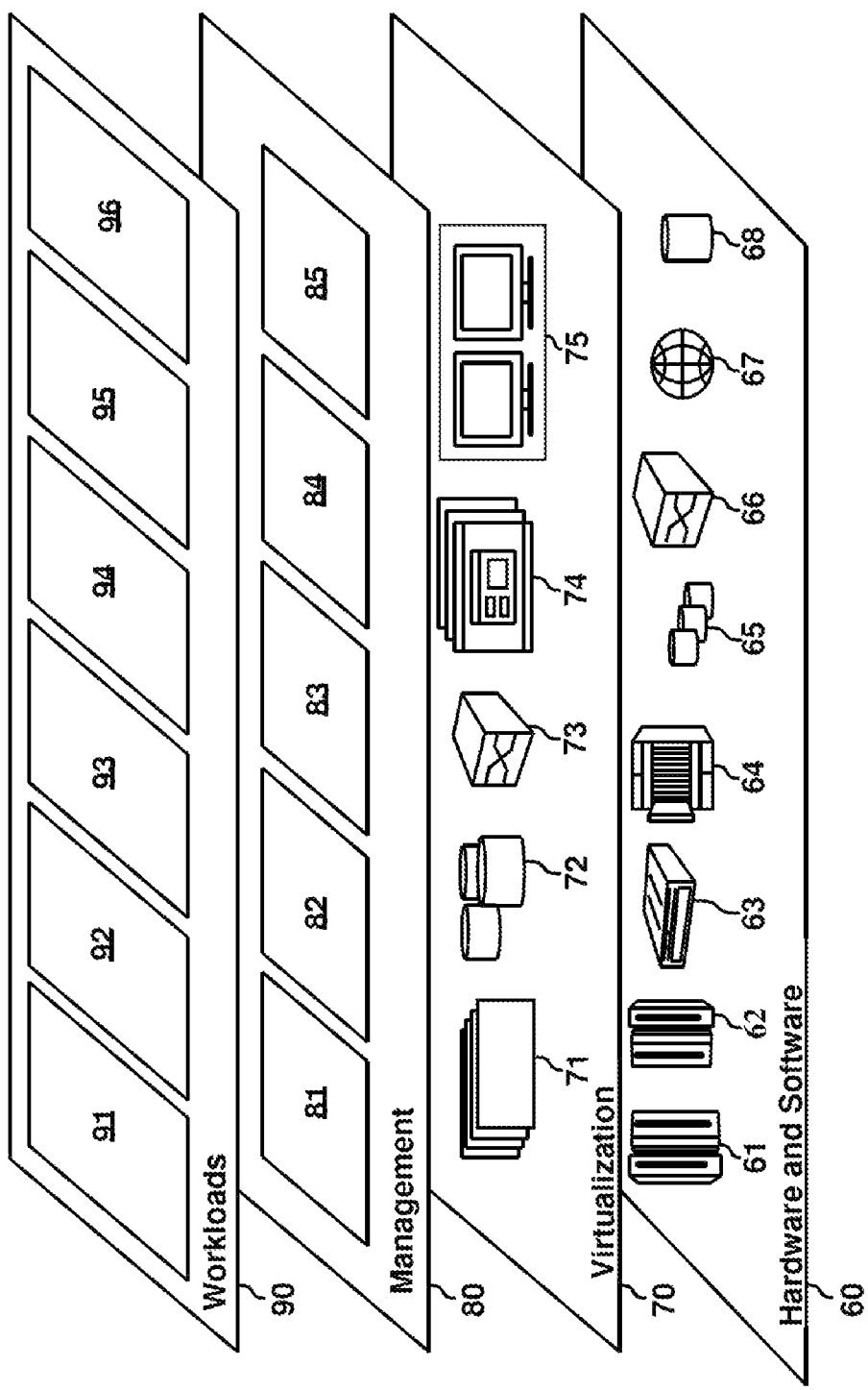
FIG. 5 depicts abstraction model layers in a cloud computing environment, in accordance with one embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of keyword extraction with an advanced term frequency-inverse document frequency (TF-IDF) method for word embedding.

What is claimed is:

1. A computer-implemented method for keyword extraction, the method comprising:
    (a) vectorizing word sets, wherein the word sets are formed by splitting text in a corpus;
    (b) training a Gaussian mixture distribution model for the word sets, by using all vectorized word sets as training data;
    (c) obtaining an inverse document frequency (IDF) value of a respective one of the word sets, from a learned Gaussian mixture distribution model for the word sets;
    (d) training a Gaussian mixture distribution model for a respective one of clusters, by using vectorized word sets in the respective one of the clusters as training data;
    (e) obtaining a term frequency (TF) value of the respective one of the word sets in the respective one of the clusters, from a learned Gaussian mixture distribution model for the respective one of the clusters;
    (f) calculating a term frequency—inverse document frequency (TF-IDF) value of the respective one of the word sets in the respective one of the clusters, based on the TF value and the IDF value;
    (g) executing (c)-(f) to calculate TF-IDF values of all the word sets in all the clusters; and
    (h) obtaining extracted keywords, by rearranging all the word sets in a descending order of the TF-IDF values of all the word sets in all the clusters.

2. The computer-implemented method of claim 1, further comprising:
    obtaining an occurrence probability of the respective one of the word sets, from the learned Gaussian mixture distribution model for the word sets; and
    using a reciprocal of the occurrence probability of the respective one of the word sets as the IDF value of the respective one of the word sets.

3. The computer-implemented method of claim 1, further comprising:
    obtaining an occurrence probability of the respective one of the word sets in the respective one of the clusters, from the learned Gaussian mixture distribution model for the respective one of the clusters; and using the occurrence probability of the respective one of the word sets in the respective one of the clusters as the TF value of the respective one of the word sets in the respective one of the clusters.

4. The computer-implemented method of claim 1, wherein the TF-IDF value of the respective one of the word sets in the respective one of the clusters is calculated by multiplying the TF value and the IDF value.

5. The computer-implemented method of claim 1, further comprising:

vectorizing the corpus, by applying an embedded representation acquisition model to the corpus; and classifying the text into the clusters, by clustering a vectorized corpus.

6. The computer-implemented method of claim 1, wherein the learned Gaussian mixture distribution model for the word sets represents a probability density distribution in a semantic space of the all vectorized word sets.

7. The computer-implemented method of claim 1, wherein the learned Gaussian mixture distribution model for the respective one of the clusters represents a probability density distribution in a semantic space of the vectorized word sets in the respective one of the clusters.

8. A computer program product for keyword extraction, the computer program product comprising a non-transitory computer readable storage medium having program instructions embodied therewith, the program instructions executable by one or more processors, the program instructions executable to:

(a) vectorize word sets, wherein the word sets are formed by splitting text in a corpus;

(b) train a Gaussian mixture distribution model for the word sets, by using all vectorized word sets as training data;

(c) obtain an inverse document frequency (IDF) value of a respective one of the word sets, from a learned Gaussian mixture distribution model for the word sets;

(d) train a Gaussian mixture distribution model for a respective one of clusters, by using vectorized word sets in the respective one of the clusters as training data;

(e) obtain a term frequency (TF) value of the respective one of the word sets in the respective one of the clusters, from a learned Gaussian mixture distribution model for the respective one of the clusters;

(f) calculate a term frequency—inverse document frequency (TF-IDF) value of the respective one of the word sets in the respective one of the clusters, based on the TF value and the IDF value;

(g) execute (c)-(f) to calculate TF-IDF values of all the word sets in all the clusters; and (h) obtain extracted keywords, by rearranging all the word sets in a descending order of the TF-IDF values of all the word sets in all the clusters.

9. The computer program product of claim 8, wherein c the program instructions are further executable to:

obtain an occurrence probability of the respective one of the word sets, from the learned Gaussian mixture distribution model for the word sets; and use a reciprocal of the occurrence probability of the respective one of the word sets as the IDF value of the respective one of the word sets.

10. The computer program product of claim 8, wherein the program instructions are further executable to:

obtain an occurrence probability of the respective one of the word sets in the respective one of the clusters, from the learned Gaussian mixture distribution model for the respective one of the clusters; and use the occurrence probability of the respective one of the word sets in the respective one of the clusters as the TF value of the respective one of the word sets in the respective one of the clusters.

11. The computer program product of claim 8, wherein the TF-IDF value of the respective one of the word sets in the respective one of the clusters is calculated by multiplying the TF value and the IDF value.

12. The computer program product of claim 8, wherein the program instructions are further executable to:

vectorize the corpus, by applying an embedded representation acquisition model to the corpus; and classify the text into the clusters, by clustering a vectorized corpus.

13. The computer program product of claim 8, wherein the learned Gaussian mixture distribution model for the word sets represents a probability density distribution in a semantic space of the all vectorized word sets.

14. The computer program product of claim 8, wherein the learned Gaussian mixture distribution model for the respective one of the clusters represents a probability density distribution in a semantic space of the vectorized word sets in the respective one of the clusters.

15. A computer system for keyword extraction, the computer system comprising:

one or more processors, one or more computer readable tangible storage devices, and program instructions stored on at least one of the one or more computer readable tangible storage devices for execution by at least one of the one or more processors, the program instructions executable to:

(a) vectorize word sets, wherein the word sets are formed by splitting text in a corpus;

(b) train a Gaussian mixture distribution model for the word sets, by using all vectorized word sets as training data;

(c) obtain an inverse document frequency (IDF) value of a respective one of the word sets, from a learned Gaussian mixture distribution model for the word sets;

(d) train a Gaussian mixture distribution model for a respective one of clusters, by using vectorized word sets in the respective one of the clusters as training data;

(e) obtain a term frequency (TF) value of the respective one of the word sets in the respective one of the clusters, from a learned Gaussian mixture distribution model for the respective one of the clusters;

(f) calculate a term frequency—inverse document frequency (TF-IDF) value of the respective one of the word sets in the respective one of the clusters, based on the TF value and the IDF value;

(g) execute (c)-(f) to calculate TF-IDF values of all the word sets in all the clusters; and (h) obtain extracted keywords, by rearranging all the word sets in a descending order of the TF-IDF values of all the word sets in all the clusters.

16. The computer system of claim 15, wherein c the program instructions are further executable to:

obtain an occurrence probability of the respective one of the word sets, from the learned Gaussian mixture distribution model for the word sets; and use a reciprocal of the occurrence probability of the respective one of the word sets as the IDF value of the respective one of the word sets.

17. The computer system of claim 15, wherein the program instructions are further executable to:

obtain an occurrence probability of the respective one of the word sets in the respective one of the clusters, from the learned Gaussian mixture distribution model for the respective one of the clusters; and use the occurrence probability of the respective one of the word sets in the respective one of the clusters as the TF value of the respective one of the word sets in the respective one of the clusters.

18. The computer system of claim 15, wherein the TF-IDF value of the respective one of the word sets in the respective one of the clusters is calculated by multiplying the TF value and the IDF value.

19. The computer system of claim 15, wherein the program instructions are further executable to:

vectorize the corpus, by applying an embedded representation acquisition model to the corpus; and classify the text into the clusters, by clustering a vectorized corpus.

20. The computer system of claim 15, wherein the learned Gaussian mixture distribution model for the word sets represents a probability density distribution in a semantic space of the all vectorized word sets, wherein the learned Gaussian mixture distribution model for the respective one of the clusters represents a probability density distribution in a semantic space of the vectorized word sets in the respective one of the clusters.

\* \* \* \* \*